US008909689B2

(12) United States Patent
Shimizu et al.

(10) Patent No.: US 8,909,689 B2
(45) Date of Patent: Dec. 9, 2014

(54) ARITHMETIC DEVICE

(75) Inventors: Hideo Shimizu, Kanagawa (JP); Yuichi Komano, Kanagawa (JP); Koichi Fujisaki, Kanagawa (JP); Shinichi Kawamura, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 394 days.

(21) Appl. No.: 13/361,074

(22) Filed: Jan. 30, 2012

(65) Prior Publication Data

US 2012/0131078 A1  May 24, 2012

Related U.S. Application Data

(63) Continuation of application No. PCT/JP2009/066537, filed on Sep. 24, 2009.

(51) Int. Cl.
*G06F 7/72* (2006.01)

(52) U.S. Cl.
CPC .................................... *G06F 7/728* (2013.01)
USPC ......................................................... 708/491

(58) Field of Classification Search
None
See application file for complete search history.

(56) References Cited

U.S. PATENT DOCUMENTS

| 6,175,850 | B1 | 1/2001 | Ishii et al. | |
|---|---|---|---|---|
| 7,647,367 | B2 | 1/2010 | Fischer et al. | |
| 2001/0054052 | A1 | 12/2001 | Arazi | |
| 2009/0106342 | A1* | 4/2009 | Takahashi et al. | 708/491 |
| 2010/0293216 | A1* | 11/2010 | Kim et al. | 708/491 |
| 2012/0131078 | A1* | 5/2012 | Shimizu et al. | 708/204 |

FOREIGN PATENT DOCUMENTS

| JP | 8-147266 | 6/1996 |
|---|---|---|
| JP | 10-307710 | 11/1998 |
| JP | 2005-221830 | 8/2005 |
| JP | 4302640 | 7/2009 |

OTHER PUBLICATIONS

International Search Report mailed Dec. 12, 2009 in PCT/JP2009/066537 filed Sep. 24, 2009 (with English Translation).
D. Hankerson, et al. "Guide to Elliptic Curve Arithmetic", 2004, p. 98.
Holger Sedlak, "The RSA Cryptography Processor", 1998, Eurocrypt 87, pp. 95-105.

* cited by examiner

*Primary Examiner* — David H Malzahn
(74) *Attorney, Agent, or Firm* — Oblon, Spivak, McClelland, Maier & Neustadt, L.L.P.

(57) ABSTRACT

According to one embodiment, a first shift amount calculation unit counts the number of continuous zeros from a less significant bit toward a more significant bit of an intermediate result of a computation of Montgomery multiplication result z and calculates a first shift amount. A second shift amount calculation unit counts the number of continuous zeros from a less significant bit toward a more significant bit of redundant-binary-represented integer x and calculates a second shift amount. An addition/subtraction unit calculates the intermediate result by adding/subtracting, with respect to the intermediate result which has been bit-shifted by the first shift amount, the integer p, and the integer y which has been bit-shifted by the second shift amount. An output unit outputs, as the Montgomery multiplication result z, the intermediate result when the sum of the first shift amounts is equal to the number of bits of the integer p.

19 Claims, 5 Drawing Sheets

| step | xcnt | xsft | ysft | ysgn | z | zcnt | zext | zsft | psgn |
|---|---|---|---|---|---|---|---|---|---|
| 1 | 0 | 1 | 1 | +1 | 0000 | 0 | 0 | 0 | 0 |
| 2 | 2 | 2 | 3 | -1 | 01aa | 0 | 2 | 1 | +1 |
| 3 | 5 | 3 | 4 | +1 | fb28 | 1 | 4 | 3 | +1 |
| 4 | 9 | 0 | 1 | 0 | 0db0 | 4 | 4 | 4 | 0 |
| - | 10 | - | - | - | 00db | 8 | | - | - |

FIG.8

ARITHMETIC DEVICE

CROSS-REFERENCE TO RELATED APPLICATIONS

This application is a continuation of PCT international application Ser. No. PCT/JP2009/066537, filed on Sep. 24, 2009, and which designates the United States; the entire contents of which are incorporated herein by reference.

FIELD

Embodiments described herein relate generally to an arithmetic device.

BACKGROUND

Finite field arithmetic operations, which use the remainder of an arithmetic result between integers, have been used for basic techniques which are applicable to various fields such as error correction codes (ECC) and cryptography. Partly due to the wide application field, a number of studies have been conducted in order to make the circuits performing multiplications and modular arithmetic operations faster, be implemented in a smaller size, and consume less power. A modular multiplication is an operation of calculating the remainder when dividing the multiplication result of integers by another integer. For example, a Montgomery multiplication is known as an algorithm which can execute the modular multiplication at a high speed.

When using the Montgomery multiplication, numbers on a finite field subject to an arithmetic operation are mapped in advance to numbers on the Montgomery space, and then the Montgomery multiplication is performed. The result of the Montgomery multiplication is mapped back to the numbers on the finite field. In this way, it is possible to obtain the result which originally is to be obtained. Since the Montgomery multiplication requires conversion and inverse conversion, the use of the Montgomery multiplication for a single modular multiplication incurs a large cost, but the Montgomery multiplication is well-suited to a case when successively performing the modular multiplication several times as in a modular exponentiation operation.

There are mainly two implementation methods for the Montgomery multiplication. The first implementation method uses word multipliers. When one word is made up of 32 bits, for example, this method uses 32-bit multipliers capable of calculating a 64-bit product which is the multiplication result of 32 bits by 32 bits. In this case, it is known that $(2 \times M^2 + M)$ multiplications are required if the number of words of the modulus is M. If there is one multiplier, a single Montgomery multiplication requires $(2 \times M^2 + M)$ clocks.

The other implementation method uses adders of a large number of digits. This method uses adders capable of calculating the addition result of 1024 bits+1024 bits if the modulus is made up of 1024 bits. $(2 \times m)$ additions are required if the number of bits of the modulus is m. If there is one adder, a single Montgomery multiplication requires $(2 \times m)$ clocks.

For example, when a word-based Montgomery multiplication uses 32×32-bit multipliers, and the modulus is made up of 1024 bits, M=32 words, and therefore, 2080 clocks are required. On the other hand, in the Montgomery multiplication using adders, when the modulus is made up of 1024 bits, 2048 clocks are required. When the modulus is made up of 2048 bits, M=64 words, and therefore, 8256 clocks are required in the word-based Montgomery multiplication, while 4096 clocks are required in the Montgomery multiplication using adders.

Moreover, as a method of accelerating multiplications, there is a known method of using a redundant binary representation such as a Non-Adjacent Form (NAF; see D. Hankerson, A. Menezes, S. Vanstone, "Guide to Elliptic Curve Cryptography," Springer, 2004, p. 98.). This method accelerates multiplications taking advantage of the fact that the average number of zeros included increases when a multiplier is represented in a redundant binary representation.

Furthermore, as a method for accelerating modular multiplications as well as multiplications using a redundant binary representation, a ZDN method is known (for example, see H. Sedlak, "The RSA cryptography processor," Proceedings of EUROCRYPT '87 (Amsterdam) (D. Chaum and W. L. Price, eds.), LNCS, vol. 304, Springer-Verlag, Berlin, 1988, pp. 95-105). In the ZDN method, when the number of bits of the modulus is m, ideally, it is possible to calculate a modular multiplication with m/3 clocks (steps). For example, when the number of bits of the modulus is 1024, ideally, it is possible to calculate a modular multiplication with 342 steps.

However, the ZDN method is a method which performs the arithmetic process sequentially from the significant bit. That is, the ZDN method is a left-to-right process (L-R process). In general, in the case of the L-R process, there is a problem in that it is difficult to change the number of processing bits. For example, the position of the most significant bit changes between when processing 1024 bits and when processing 512 bits. As a result, there is a problem in that a plurality of circuits are required so as to correspond to the bit position from which the process starts. Therefore, in order to implement the ZDN method under the present circumstances, it may be a practical solution to fix the number of processing bits. Since the ZDN method is an algorithm which processes from the most significant bit, there is a problem in that it is difficult to freely change the number of processing bits.

On the other hand, as described above, the Montgomery multiplication of the related art requires $2 \times M^2 + M$ clocks or $2 \times m$ clocks and has a problem associated with its processing speed which is slower than the ZDN method.

DETAILED DESCRIPTION

In general, according to one embodiment, a first shift amount calculation unit counts the number of continuous zeros from a less significant bit toward a more significant bit of an intermediate result of a computation of Montgomery multiplication result z and calculates a first shift amount. A second shift amount calculation unit counts the number of continuous zeros from a less significant bit toward a more significant bit of redundant-binary-represented integer x and calculates a second shift amount. An addition/subtraction unit calculates the intermediate result by adding/subtracting, with respect to the intermediate result which has been bit-shifted by the first shift amount, the integer p, and the integer y which has been bit-shifted by the second shift amount. An output unit outputs, as the Montgomery multiplication result z, the intermediate result when the sum of the first shift amounts is equal to the number of bits of the integer p.

Hereinafter, an embodiment of an arithmetic device will be described in detail with reference to the accompanying drawings.

An arithmetic device according to the present embodiment receives integers x, y, and p as its input and calculates a Montgomery multiplication result z (hereinafter referred to as a multiplication result z) of the integers x and y modulo the integer p. In this case, the arithmetic operation is repeatedly executed while sequentially converting the integer x to a redundant binary representation from the less significant bit thereof, and the arithmetic result when a predetermined end condition is satisfied is output as a multiplication result z. In the following description, the result of the arithmetic operation executed repeatedly will be referred to as an intermediate result, and the result which is finally output will be referred to as a multiplication result. Both the intermediate result and the multiplication result are stored in a predetermined register for storing the multiplication result z. Thus, in the following description, both the intermediate result and the multiplication result are sometimes denoted by "z."

Figure 1:
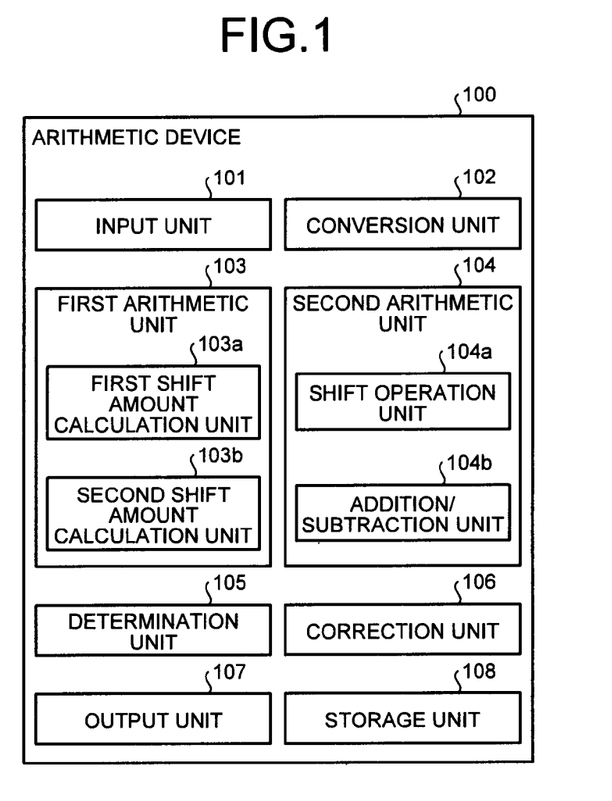
FIG. 1 is a block diagram of an arithmetic device.

FIG. 1 is a block diagram showing an example of the configuration of an arithmetic device 100 according to the present embodiment. As shown in FIG. 1, the arithmetic device 100 includes an input unit 101, a conversion unit 102, a first arithmetic unit 103, a second arithmetic unit 104, a determination unit 105, a correction unit 106, an output unit 107, and a storage unit 108.

The input unit 101 receives the input of various data (input values) used in an arithmetic operation. For example, the input unit 101 receives the input of integers x, y, and p used in a Montgomery multiplication.

The conversion unit 102 converts an integer to a redundant binary representation. For example, the conversion unit 102 converts the input integer x to a redundant binary representation.

The first arithmetic unit 103 calculates the shift amount zsft (first shift amount) of the intermediate result z, the shift amount ysft (second shift amount) of the integer y, and information (ysgn, psgn) for determining whether the bit-shifted integer y and the integer p will be added or subtracted. The first arithmetic unit 103 includes a first shift amount calculation unit 103a and a second shift amount calculation unit 103b.

The first shift amount calculation unit 103a counts a first counted number that is the number of continuous zero-bits from the less significant bit toward the more significant bit of the intermediate result z and calculates the first counted number as zsft. Specifically, the first shift amount calculation unit 103a counts the number zsft of continuous zero-bits from the least significant bit toward the more significant bit of the intermediate result z up to a certain number of bits which are changed whenever the intermediate result z is calculated. The number of bits which are changed whenever the intermediate result z is calculated corresponds to the difference between the number of processed bits of x at that point in time and the number of processed bits of z. That is, the first shift amount calculation unit 103a calculates, as zsft, the number of continuous zeros from the less significant bit to the more significant bit of the intermediate result z, the number being such that the sum of the number and the number of processed bits of the intermediate result z does not exceed the number of processed bits of x.

The second shift amount calculation unit 103b counts a second counted number that is the number of continuous zeros from the less significant bit to the more significant bit of the integer x represented in the redundant binary representation and calculates ysft based on the second counted number. Specifically, the second shift amount calculation unit 103b counts the number of continuous zeros from the less significant bit to the more significant bit of the bits included in the integer x represented in the redundant binary representation, excluding a processed bit for which the number of continuous zeros has been counted and a bit (having a value other than "0") which is one place more significant than the processed bit. Moreover, the second shift amount calculation unit 103b calculates ysft using the second counted number, the number of processed bits of the integer x, the number of processed bits of the intermediate result z, and zsft.

Details of a method of calculating zsft, ysft, ysgn, and psgn by the first arithmetic unit 103 will be described later.

The second arithmetic unit 104 executes a shift arithmetic operation of the intermediate result z and the integer y and executes an addition/subtraction of the shift arithmetic result and the like based on zsft, ysft, ysgn, and psgn calculated by the first arithmetic unit 103. The second arithmetic unit 104 includes a shift operation unit 104a and an addition/subtraction unit 104b.

The shift operation unit 104a performs a right shift of the intermediate result z by zsft positions. Moreover, the shift operation unit 104a performs a left shift of the integer y by ysft positions.

The addition/subtraction unit 104b receives the shifted intermediate result z, the shifted integer y, and the integer p and executes the addition or subtraction of the integers y and p with respect to the intermediate result z in accordance with ysgn and psgn.

The determination unit 105 determines whether the arithmetic operation executed repeatedly is to be ended. Specifically, the determination unit 105 determines that the arithmetic operation is to be ended when the number of processed bits of the intermediate result z exceeds the number of bits of the integer p.

The correction unit 106 corrects the multiplication result z, which is the intermediate result when the determination to end is made. Specifically, the correction unit 106 corrects the multiplication result z by adding the integer p to the multiplication result z when the multiplication result z is less than 0. Moreover, the correction unit 106 corrects the multiplication result z by subtracting the integer p from the multiplication result z when the multiplication result z is equal to or greater than the integer p.

The output unit 107 outputs the multiplication result z which is the intermediate result when the determination to end the arithmetic operation is made. When correction is performed by the correction unit 106, the output unit 107 outputs the multiplication result z after correction.

The storage unit 108 stores various data (input values, intermediate result, and the like) used in the arithmetic operation. The storage unit 108 may be configured by any storage medium generally used such as a Hard Disk Drive (HDD), an optical disc, a memory card, or a Random Access Memory (RAM).

Figure 2:
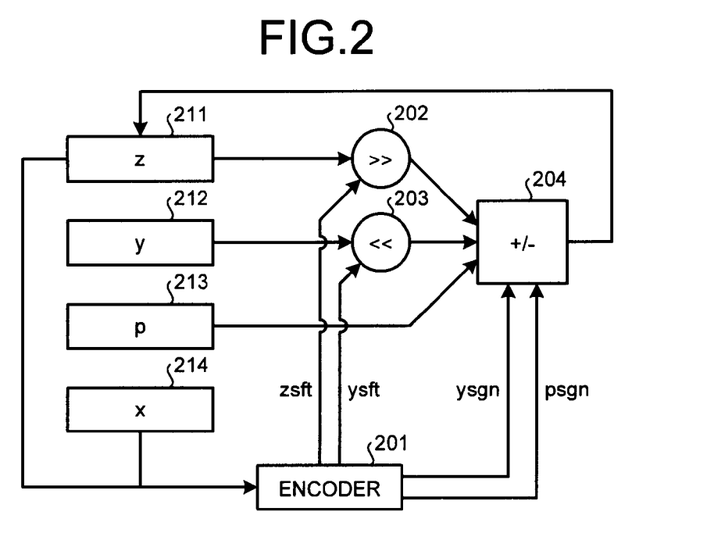
FIG. 2 is a diagram showing a circuit configuration example of the arithmetic device.

Next, a circuit configuration of the arithmetic device 100 will be described with reference to FIG. 2. FIG. 2 is a diagram showing an example of the circuit configuration of the arithmetic device 100. FIG. 2 mainly illustrates a configuration example of a circuit corresponding to the first arithmetic unit 103, the second arithmetic unit 104, and the storage unit 108 shown in FIG. 1.

As illustrated in FIG. 2, the arithmetic device 100 includes an encoder 201, a right shift operator 202, a left shift operator 203, a 3-input adder/subtractor 204, and registers 211, 212, 213, and 214.

The registers 211, 212, 213, and 214 store the intermediate result z (the multiplication result z), and the integers y, p, and x, respectively. The registers 211 to 214 store the respective integers represented as multiple-precision integers, for example. The output of the register 211 is input to the right shift operator 202. The output of the register 212 is input to the left shift operator 203.

The right shift operator 202 right-shifts the input intermediate result z by zsft bits and outputs the right-shifted intermediate result z. The left shift operator 203 left-shifts the input integer y by ysft bits and outputs the left-shifted integer y.

The 3-input adder/subtractor 204 adds the product of ysgn and the output (the integer y) of the left shift operator 203 to the output (the intermediate result z) of the right shift operator 202 and moreover adds the product of psgn and the output (the integer p) of the register 213. That is, the 3-input adder/subtractor 204 adds the integer y to the intermediate result z when ysgn is "1" and subtracts the integer y from the intermediate result z when ysgn is "−1," but does not perform addition or subtraction of the integer y when ysgn is "0." Moreover, the 3-input adder/subtractor 204 adds the integer p to the addition/subtraction result of the intermediate result z and the integer y when psgn is "1" and subtracts the integer p from the addition/subtraction result when psgn is "−1," but does not perform addition or subtraction of the integer p when psgn is "0."

The encoder 201 determines zsft, ysft, ysgn, and psgn based on the intermediate result z, the integers x and p, and the states of the other variables used in the arithmetic operation and outputs the determined zsft, ysft, ysgn, and psgn. Details of the method of determining these values by the encoder 201 will be described later.

The registers 211, 212, 213, and 214 shown in FIG. 2 correspond to the storage unit 108 shown in FIG. 1. Moreover, the encoder 201 shown in FIG. 2 corresponds to the first arithmetic unit 103 shown in FIG. 1. Furthermore, the right shift operator 202 and the left shift operator 203 shown in FIG. 2 correspond to the shift operation unit 104a shown in FIG. 1. Furthermore, the 3-input adder/subtractor 204 shown in FIG. 2 corresponds to the addition/subtraction unit 104b shown in FIG. 1.

Figure 3:
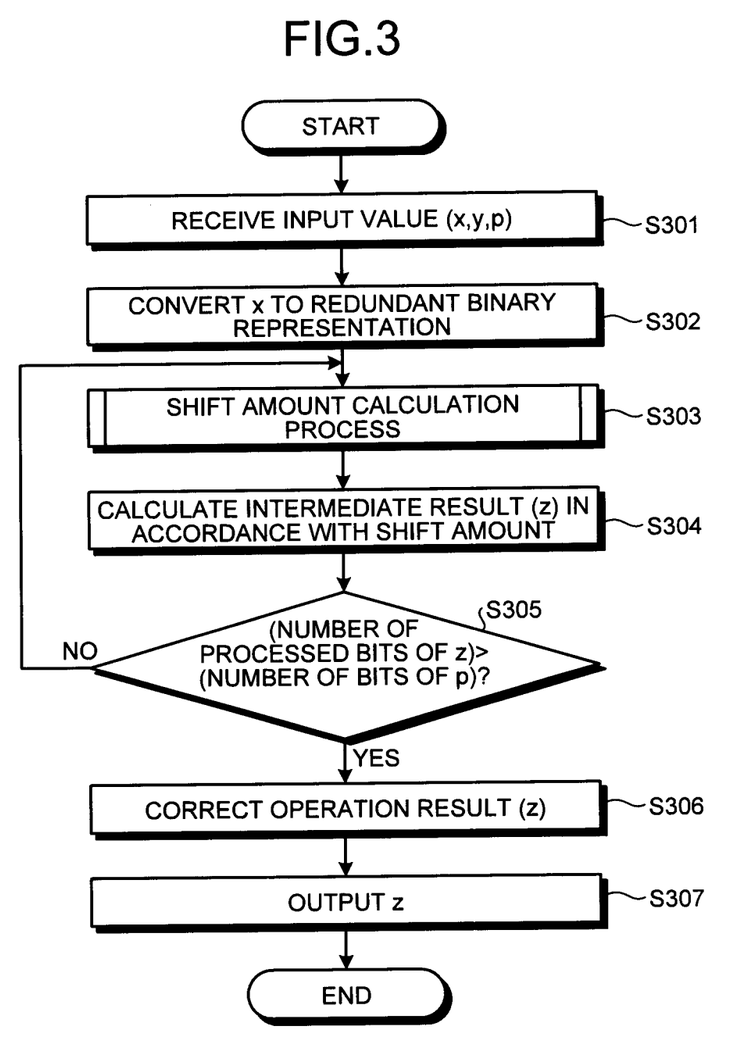
FIG. 3 is a flowchart of an operation process.

Next, an arithmetic process by the arithmetic device 100 according to the present embodiment having the above configuration will be described with reference to FIG. 3. FIG. 3 is a flowchart showing an overall flow of the arithmetic process according to the present embodiment.

First, the input unit 101 receives the input of the integers x, y, and p which are the input values used in an arithmetic operation (step S301).

Subsequently, the conversion unit 102 converts the integer x to a redundant binary representation (step S302). Although in FIG. 3, the input integer x is converted to the redundant binary representation before the repeated arithmetic operation (steps S303 to S305), the integer x may be converted to the redundant binary representation during the repeated arithmetic operation.

Subsequently, the first arithmetic unit 103 executes a shift amount calculation process to calculate ysft and zsft (step S303). Details of the shift amount calculation process will be described later. Subsequently, the second arithmetic unit 104 shifts the intermediate result z and the integer y in accordance with the calculated shift amount and calculates a new intermediate result z using the shift result (step S304). Specifically, the second arithmetic unit 104 calculates the intermediate result z in accordance with Equation (1) below. In the equation, ">>" and "<<" represent a right shift arithmetic operation and a left shift arithmetic operation, respectively.

$$z=(z>>zsft)+ysgn\times(y<<ysft)+psgn\times p \quad (1)$$

Subsequently, the determination unit 105 determines whether the number of processed bits of z is greater than the number of bits of the integer p (step S305). When the number of processed bits of z is equal to or less than the number of bits of the integer p (No in step S305), the flow returns to step S303, and the process is repeated. That is, the shift amount calculation process (step S303) and the process of calculating the new intermediate result z (step S304) are repeatedly executed using the intermediate result z calculated in step S304.

When the number of processed bits of z is greater than the number of bits of the integer p (Yes in step S305), the correction unit 106 corrects the multiplication result z (the value of the register 211 at that point in time) as necessary (step S306). Moreover, the output unit 107 outputs the multiplication result z as the result of the Montgomery multiplication (step S307) and ends the arithmetic process.

Figure 4:
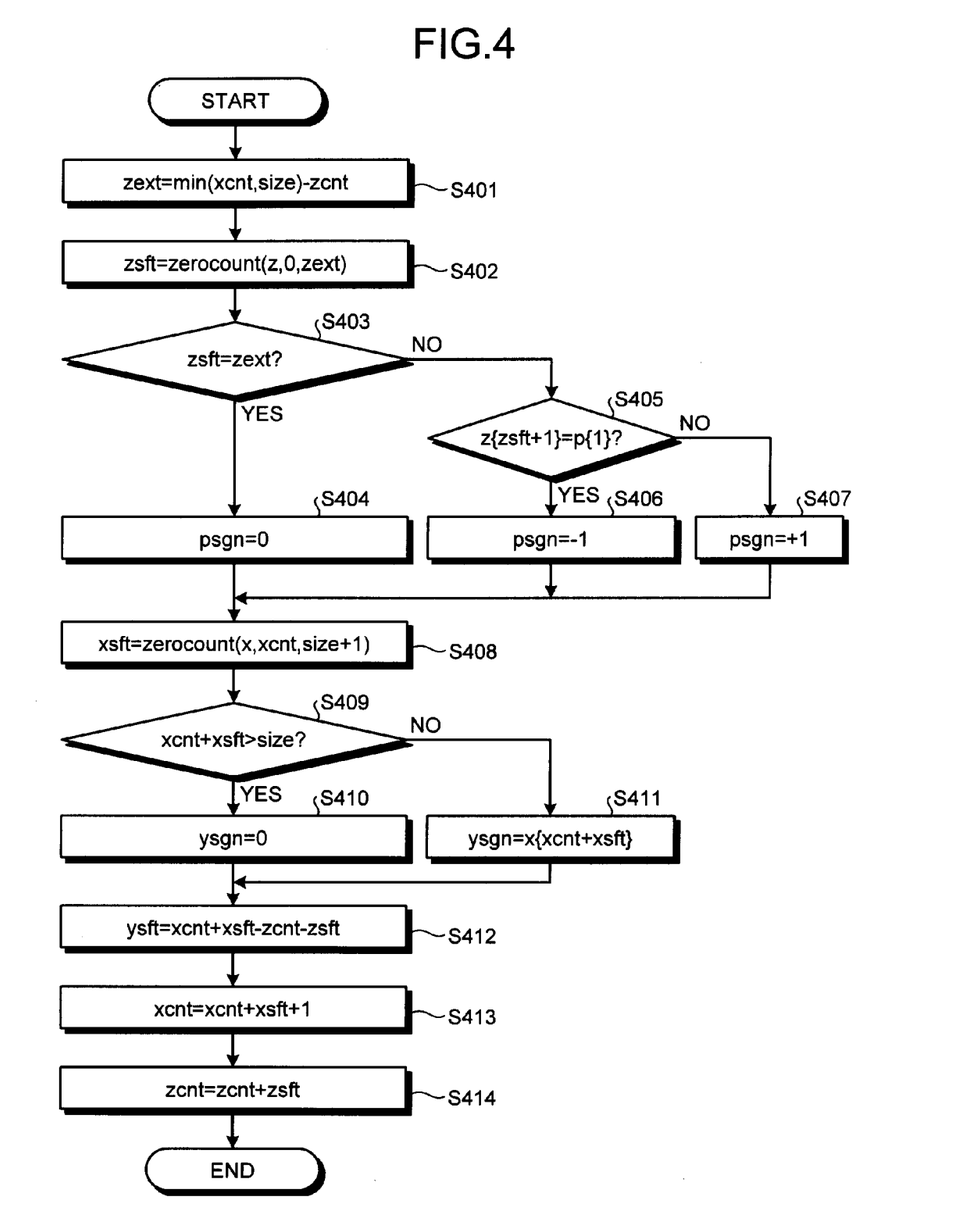
FIG. 4 is a flowchart of a shift amount calculation process.

Next, the details of the shift amount calculation process in step S303 will be described with reference to FIG. 4. FIG. 4 is a flowchart showing an example of the shift amount calculation process.

First, the first arithmetic unit 103 calculates zext representing a range in which continuous zeros are searched in accordance with Equation (2) below (step S401).

$$zext=\min(xcnt,size)-zcnt \quad (2)$$

Here, "xcnt" represents the sum of the number of processed bits of the integer x, which have been processed up to the previous step (the previous repeated arithmetic operation). Moreover, "zcnt" represents the sum of zsft up to the previous step. Furthermore, "size" represents the size of the input integer p. Furthermore, "min(a,b)" represents a function that returns the minimum value of "a" and "b."

Subsequently, the first shift amount calculation unit 103a calculates zsft in accordance with Equation (3) below (step S402). In the equation, the function "zerocount(a,b,c)" represents a function that returns the number of continuous zero-bits from the less significant bit to the more significant bit of a partial bit string which is in the range of distance of b bits or greater and of less than c bits, from the less significant bit of a. Details of this function will be described later.

$$zsft=zerocount(z,0,zext) \quad (3)$$

Subsequently, the first arithmetic unit 103 determines whether zsft is equal to zext (step S403). When zsft is equal to zext (Yes in step S403), the first arithmetic unit 103 sets psgn to "0" (step S404). When zsft is not equal to zext (No in step S403), the first arithmetic unit 103 determines whether the value of a (zsft+1)-th bit from the less significant bit of the intermediate result z is equal to the value of the first bit from the less significant bit of the integer p (step S405). In FIG. 4, "a{b}" represents the value of a "b"-th bit from the less significant bit of "a."

When the value of a (zsft+1)-th bit from the less significant bit of the intermediate result z is equal to the value of the first bit from the less significant bit of the integer p (Yes in step S405), the first arithmetic unit 103 sets psgn to "−1" (step S406). When the value of a (zsft+1)-th bit from the less significant bit of the intermediate result z is not equal to the value of the first bit from the less significant bit of the integer p (No in step S405), the first arithmetic unit 103 sets psgn to "+1" (step S407).

Subsequently, the first arithmetic unit 103 calculates xsft representing the number of continuous zeros from the less significant bit to the more significant bit of the integer x represented in the redundant binary representation in accordance with Equation (4) below (step S408).

$$xsft = \text{zerocount}(x, xcnt, \text{size}+1) \quad (4)$$

Subsequently, the first arithmetic unit 103 determines whether the sum of xcnt and xsft is greater than the "size" (step S409). When the sum of xcnt and xsft is greater than the "size" (Yes in step S409), the first arithmetic unit 103 sets ysgn to "0" (step S410). When the sum of xcnt and xsft is equal to or less than the "size" (No in step S409), the first arithmetic unit 103 calculates ysgn in accordance with Equation (5) below (step S411).

$$ysgn = x\{xcnt+xsft\} \quad (5)$$

Subsequently, the second shift amount calculation unit 103b calculates ysft in accordance with Equation (6) below (step S412).

$$ysft = xcnt+xsft = zcnt-zsft \quad (6)$$

Subsequently, the first arithmetic unit 103 calculates xcnt in accordance with Equation (7) below (step S413). Moreover, the first arithmetic unit 103 calculates zcnt in accordance with Equation (8) below (step S414).

$$xcnt = xcnt+xsft+1 \quad (7)$$

$$zcnt = zcnt+zsft \quad (8)$$

Figure 5:
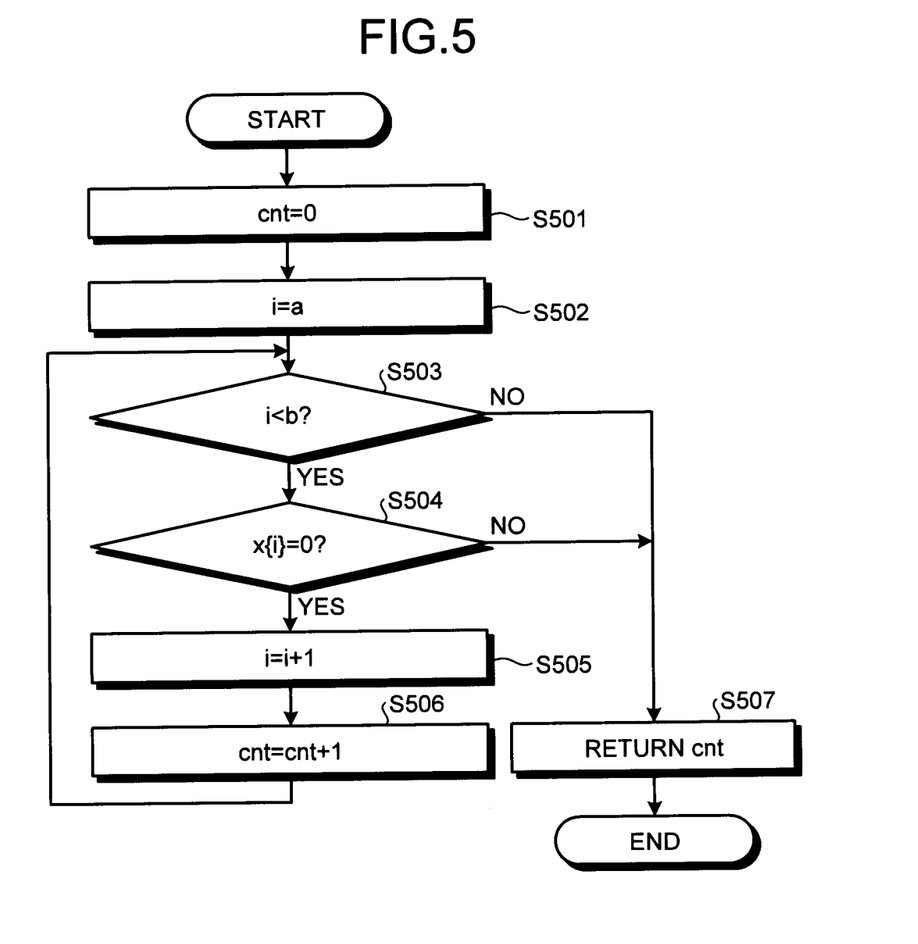
FIG. 5 is a flowchart of a function "zerocount;"

Subsequently, details of the process of the function "zerocount" used in steps S402 and S408 will be described with reference to FIG. 5. FIG. 5 is a flowchart showing an example of the process of the function "zerocount". FIG. 5 illustrates an example (zerocount(x,a,b)) where x, a, and b are input as parameters.

First, a counter cnt is initialized to 0 (step S501). Subsequently, a variable "i" is set to an input value "a" (step S502). Subsequently, it is determined whether the variable "i" is less than an input value b (step S503). When the variable "i" is less than the input value b (Yes in step S503), it is determined whether the value of an i-th bit from the less significant bit of the input value x is "0" (step S504).

When the value of the i-th bit from the less significant bit of the input value x is "0" (Yes in step S504), "1" is added to i and cnt, respectively (steps S505 and S506). After that, the flow returns to step S503, and the process is repeated.

When it is determined in step S503 that the variable "i" is equal to or greater than the input value b (No in step S503), or when it is determined in step S504 that the value of the i-th bit from the less significant bit of the input value x is not "0" (No in step S504), cnt at that point in time is output as the output value of the function (step S507).

Figure 6:
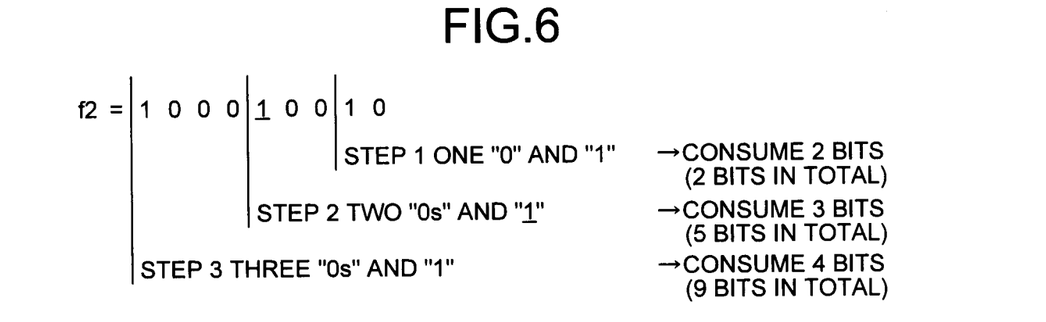
FIG. 6 is a diagram showing the procedure of using a redundant binary representation.

Next, a specific example of the arithmetic process performed by the arithmetic device 100 having the above configuration will be described. In the following description, an example of calculating "f2×d5 mod fb" will be described. That is, an example of an arithmetic operation when integers x=f2, y=d5, and p=fb are input. All integers x, y, and p are represented in hexadecimal notations. FIG. 6 is a diagram showing an example of the procedure of using the redundant binary representation of the integer x (=f2). In FIG. 6, the underlined 1 means "−1." There are various kinds of redundant binary representations. In this example, NAF is used as the redundant binary representation. The arithmetic process of the present embodiment can be implemented by the same procedure when a redundant binary representation other than the NAF is used.

When f2 is converted to a NAF format, it is represented as "1,0,0,0, −1,0,0,1,0." Moreover, f2 in the hexadecimal notation is 242 when it is represented in a decimal notation. Since "1,0,0,0, −1,0,0,1,0" of the NAF format represents "256−16+ 2=242," it can be understood that "1,0,0,0, −1,0,0,1,0" is another representation of f2.

When "1,0,0,0, −1,0,0,1,0" is sequentially observed from the less significant bit, "1" appears after one zero, and subsequently, "−1" appears after two zeros, and then, "1" appears after three zeros. After that, "0" appears continuously, and there are no longer any "1"s in the series.

In each step (repeated arithmetic operation) of the Montgomery multiplication, the number of continuous zeros and the value of the next non-zero bit are used as a pair. That is, in the example of FIG. 6, one zero and the next "1" are used in step 1 (first repeated arithmetic operation). Subsequently, two zeros and the next "−1" are used in the next step 2. Furthermore, three zeros and the next "1" are used in the next step 3. In addition, in step 4 and later, there are no longer any "1"s in the series and an infinite number of zeros appear continuously.

The encoder 201 sets the number of continuous zeros to xsft and sets "1" or "−1" appearing subsequently to ysgn in each step. Moreover, the encoder 201 records the number of bits (number of processed bits) used up to the previous step among the bits of the redundant binary representation of the integer x. Here, the encoder 201 consumes (uses) a number of bits corresponding to (the number of continuous zeros) +(one digit) in each step.

In the example of FIG. 6, first, in step 1, one "0" and the next "1" are used. That is, two bits are consumed in step 1. Moreover, the sum of the number of processed bits up to that point in time is 2. In step 2, two "0s" and the next "−1" are used. That is, three bits are consumed in step 2. Moreover, the sum of the number of processed bits is 5. Moreover, in step 3, three "0s" and the next "1" are used. That is, four bits are consumed in step 3. Moreover, the sum of the number of processed bits is 9.

The encoder 201 sets the number of continuous zeros to xsft, sets the value of the next non-zero bit (having a value other than "0") to ysgn, and the sum of the number of bits used up to the previous step to xcnt. In step 1, xcnt is set to 0.

As the step progresses to some extent, it will eventually fall into a state where an infinite number of zeros appears continuously in the more significant bits. In this case, the encoder 201 sets xsft to "size +1−xcnt" (where size=the number of bits of the integer p).

The above process can be summarized as follows. That is, in each step, the following xcnt, xsft, and ysgn are calculated.

Step 1: xcnt=0, xsft=1, ysgn=1
Step 2: xcnt=2, xsft=2, ysgn=−1
Step 3: xcnt=5, xsft=3, ysgn=1
Step 4 and later: xcnt=9, xsft=0, ysgn=0

Next, an example when other input values are input will be described. In the following description, shown is an example of an arithmetic operation when an integer x=72 is input, and the number of bits of an integer p is 8. When "72" is converted into the NAF format, it is represented as "0,1,0,0, −1,0,0,1,0."

By the same procedure as the above example, as a result, in each step, the following xcnt, xsft, and ysgn are calculated.
Step 1: xcnt=0, xsft=1, ysgn=1
Step 2: xcnt=2, xsft=2, ysgn=−1

Step 3: xcnt=5, xsft=2, ysgn=1
Step 4: xcnt=8, xsft=1, ysgn=0
Step 5 and later: xcnt=9, xsft=0, ysgn=0

In this example, the number of bits consumed in step 4 is 1 (since xsft has one bit, and no "1" appears in a more significant bit, ysgn has zero bit). In step 4, xsft is calculated as (the number of bits of the integer p) +1−xcnt=8+1 −8=1.

Figure 7:
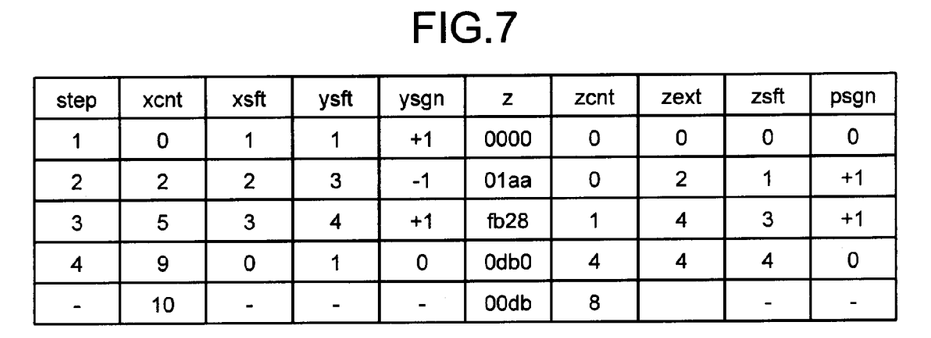
FIG. 7 is a diagram showing the values of variables in the course of calculation.

Hereinafter, another specific example of the arithmetic process performed by the arithmetic device 100 will be described. In the following description, an example of calculating "f2×d5 mod fb" will be described. FIG. 7 is a diagram showing the values of the variables in the course of calculation of "f2×d5 mod fb."

As described above, zcnt is the sum of zsft up to the previous step. Initial settings are performed so that z=0, xcnt=0, and zcnt=0. Moreover, z is assumed to have 16 bits. Since the size of the input modulus (the integer p) is 8 bits, size=8.

First, the outputs of the encoder 201 in the first step 1 are calculated. As described above, in step 1, xcnt=0, xsft=1, ysgn=1, z=0000, and zcnt=0 are obtained. Hereinafter, the description will be provided in accordance with the flowchart of FIG. 4.

zext is calculated in accordance with Equation (2) (step S401). In this example, since xcnt=0, size=8, and zcnt=0, zext=0.

Next, zsft is determined (step S402). Although zsft is the number of continuous zeros in the less significant bits of z, it takes on the value equal to or less than zext. In this example, since z=0, 16-bit zeros appear in the less significant bits. However, since zsft has to be a value equal to or less than zext (=0), zsft=0.

Subsequently, psgn is calculated (steps S403 to S407). In this example, since zsft is equal to zext, psgn=0 (step S404).

Subsequently, xsft and ysgn are calculated (steps S408 to S411). As described above, xsft=1 and ysgn=1.

Subsequently, ysft is calculated in accordance with Equation (6) above (step S412). In this example, ysft=0+1−0−0=1.

Subsequently, xcnt and zcnt are calculated in accordance with Equations (7) and (8) above, respectively (steps S413 and S414). In this example, xcnt is updated to xcnt=xcnt+xsft+1=0+1+1=2. Moreover, zcnt is updated to zcnt =zcnt+zsft=0+0=0.

In this way, zsft=(0), ysft(=1), ysgn(=+1), and psgn(=0) which are the outputs of the encoder 201 are calculated. These output values are input to Equation (1) above, whereby a new value of z is calculated (step S304 of FIG. 3). In this example, "0laa" is obtained as the new value of z.

In the subsequent step 2, in a manner similar to the above, zsft=1, ysft=3, ysgn=−1, and psgn=+1 are calculated, and z has a new value "fb28."

In step 3, in a manner similar to the above, zsft=3, ysft=4, ysgn=+1, and psgn=+1 are calculated, and z has a new value "0db0."

In step 4, in a manner similar to the above, zsft=4, ysft=1, ysgn=0, and psgn=0 are calculated, and z has a new value "00db."

In this example, the obtained result z="00db" satisfies the relation of 0z<p. Thus, the correction unit 106 does not correct z.

As described above, in the above example, an 8-bit Montgomery multiplication can be calculated with four steps. Asymptotically, the Montgomery multiplication can be calculated with a number of steps corresponding to ⅓ of the number of bits of the integer p which is the modulus. Hereinafter, asymmetric behavior of the arithmetic process of the present embodiment will be described.

When z is scanned (processed) from the less significant bit, if a certain bit is 0, the probability of the next bit to be 0 is ½, and the probability of the next bit to be 1 is also ½. Conversely, if a certain bit is 1, the next bit will always be 0 because of the algorithm of the encoder 201. This probability can be expressed as a state transition matrix A as given by Equation (9) below.

$$A = \begin{pmatrix} 1/2 & 1 \\ 1/2 & 0 \end{pmatrix} \quad (9)$$

The probabilities of being 0 and 1 can be known by examining the limit of n in A^n (multiplication of A by itself by n times). The limit when "n" in A^n is set to infinity is expressed by Equation (10) below.

$$A^\infty = \begin{pmatrix} 2/3 & 2/3 \\ 1/3 & 1/3 \end{pmatrix} \quad (10)$$

As shown in Equation (10) above, the probability of a processing bit to be "0" is ⅔, and the probability of the processing bit to be "1" is ⅓. Since the algorithm of the encoder 201 processes on when a certain bit of z is 1 (that is, zero bits are skipped), on average, the process is completed with a number of steps corresponding to ⅓ of the number of bits of p.

As described above, the arithmetic device 100 according to the present embodiment can calculate the Montgomery multiplication with approximately the same number of steps as in the ZDN method. Moreover, unlike the ZDN method, since the arithmetic operation is sequentially executed from the less significant bit of a variable, it is possible to execute the Montgomery multiplication with the input of an arbitrary number of bits.

Figure 8:
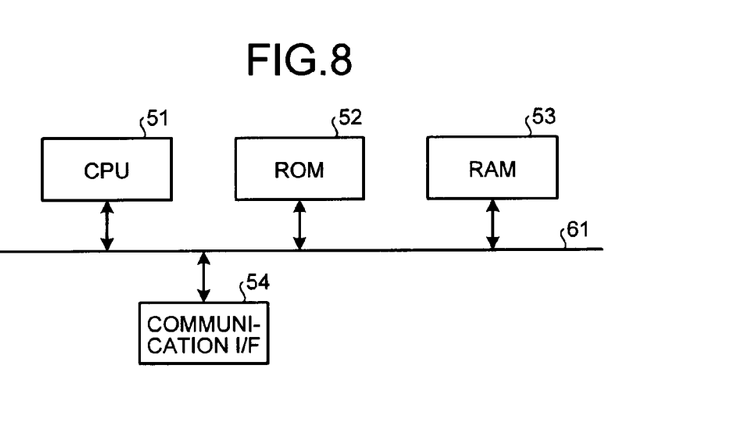
FIG. 8 is a diagram showing a hardware configuration of the arithmetic device.

Next, a hardware configuration of the arithmetic device 100 according to the present embodiment will be described with reference to FIG. 8. FIG. 8 is a diagram showing the hardware configuration of the arithmetic device 100 according to the present embodiment.

The arithmetic device 100 according to the present embodiment includes a control device such as a Central Processing Unit (CPU) 51, a storage device such as a Read Only Memory (ROM) 52 and a RAM 53, a communication I/F 54 that connects to a network to perform communication, and a bus 61 that connects respective units to each other.

An arithmetic program executed by the arithmetic device 100 according to the present embodiment is provided by being stored in advance in the ROm 52 or the like.

The arithmetic program executed by the arithmetic device 100 according to the present embodiment may be recorded in a computer-readable recording medium, such as a Compact Disk Read Only Memory (CD-ROM), a flexible disk (FD), a Compact Disk Recordable (CD-R), or a Digital Versatile Disk (DVD), as files in an installable format or an executable format and provided as a computer program product.

Furthermore, the arithmetic program executed by the arithmetic device 100 according to the present embodiment may be stored on a computer connected to a network such as the Internet and provided by being downloaded through a network. In addition, the arithmetic program executed by the arithmetic device 100 according to the present embodiment may be provided or distributed through a network such as the Internet.

The arithmetic program executed by the arithmetic device 100 according to the present embodiment can cause a computer to function as the respective units (the input unit, the conversion unit, the first arithmetic unit, the second arithmetic unit, the determination unit, the correction unit, and the output unit) of the arithmetic device 100. The computer can execute the arithmetic program by the CPU 51 reading the same from a computer-readable storage medium and loading the same onto a main storage device.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An arithmetic device that computes a Montgomery multiplication result z of the product of integers x and y modulo an integer p by a repeated arithmetic multiplication providing a plurality of intermediate results, said device comprising:
   a conversion unit that converts the integer x to a redundant binary representation;
   a first shift amount calculation unit that counts a first counted number that is the number of continuous zeros from a less significant bit toward a more significant bit of a first intermediate result of the plurality of intermediate results and calculates a first shift amount based on the first counted number;
   a second shift amount calculation unit that counts a second counted number that is the number of continuous zeroes from a less significant bit toward a more significant bit of the integer x of the redundant binary representation and calculates a second shift amount based on the second counted number;
   an addition/subtraction unit that calculates a second intermediate result of the plurality of intermediate results by adding/subtracting, with respect to the first intermediate result which has been bit-shifted by the first shift amount, the integer p, and the integer y which has been bit-shifted by the second shift amount, and sends the second intermediate result to the first shift amount calculation unit; and
   an output unit that outputs, as the Montgomery multiplication result z, a final intermediate result when the sum of the first shift amounts is equal to the number of bits of the integer p.

2. The arithmetic device according to claim 1,
wherein the first shift amount calculation unit counts the number of continuous zeroes from the least significant bit toward a more significant bit of the first intermediate result up to a certain number of bits which are changed whenever the first intermediate result is calculated, and calculates the first shift amount which is the first counted number.

3. The arithmetic device according to claim 2,
wherein the second shift amount calculation unit counts the number of continuous zeroes from the less significant bit to the more significant bit of the bits included in the integer x of the redundant binary representation, excluding a processed bit for which the number of continuous zeroes has been counted and a non-zero bit which is one place higher than the processed bit, and calculates the second shift amount based on the second counted number.

4. The arithmetic device according to claim 2,
wherein the addition/subtraction unit calculates the second intermediate result by adding/subtracting, with respect to the first intermediate result which has been bit-shifted by the first shift amount, the integer p, and the product of the integer y which has been bit-shifted by the second shift amount and the value of a bit which is one place higher than a processed bit for which the number of continuous zeroes has been counted in the integer x of the redundant binary representation, and sends the second intermediate result to the first shift amount calculation unit.

5. The arithmetic device according to claim 2,
wherein the addition/subtraction unit calculates the second intermediate result by subtracting the integer p from a value, which is obtained by adding the first intermediate result which has been bit-shifted by the first shift amount to the integer y which has been bit-shifted by the second shift amount, when the value of an n-th bit from the least significant bit in the first intermediate result is equal to the value of the least significant bit of the integer p, n being the number corresponding to the first shift amount plus 1, and sends the second intermediate result to the first shift amount calculation unit, and
the addition/subtraction unit calculates the second intermediate result by adding the integer p to the value, which is obtained by adding the first intermediate result which has been bit-shifted by the first shift amount to the integer y which has been bit-shifted by the second shift amount, when the value of the n-th bit from the least significant bit in the first intermediate result is not equal to the value of the least significant bit of the integer p, and sends the second intermediate result to the first shift amount calculation unit.

6. The arithmetic device according to claim 2,
wherein the redundant binary representation is a Non-Adjacent Form (NAF).

7. The arithmetic device according to claim 2,
wherein when the first intermediate result when the sum is equal to the number of bits of the integer p is less than 0, the output unit outputs a value obtained by adding the integer p to the first intermediate result as the Montgomery multiplication result z, and
wherein when the first intermediate result when the sum is equal to the number of bits of the integer p is equal to or greater than p, the output unit outputs a value obtained by subtracting the integer p from the first intermediate result as the Montgomery multiplication result z.

8. The arithmetic device according to claim 1,
wherein the second shift amount calculation unit counts the number of continuous zeroes from the less significant bit to the more significant bit of the bits included in the integer x of the redundant binary representation, excluding a processed bit for which the number of continuous zeroes has been counted and a non-zero bit which is one place higher than the processed bit, and calculates the second shift amount based on the second counted number.

9. The arithmetic device according to claim 8,
wherein the addition/subtraction unit calculates the second intermediate result by adding/subtracting, with respect to the first intermediate result which has been bit-shifted by the first shift amount, the integer p, and the product of the integer y which has been bit-shifted by the second shift amount and the value of a bit which is one place higher than a processed bit for which the number of continuous zeroes has been counted in the integer x of the redundant binary representation, and sends the second intermediate result to the first shift amount calculation unit.

10. The arithmetic device according to claim 8,
wherein the addition/subtraction unit calculates the second intermediate result by subtracting the integer p from a value, which is obtained by adding the first intermediate result which has been bit-shifted by the first shift amount to the integer y which has been bit-shifted by the second shift amount, when the value of an n-th bit from the least significant bit in the first intermediate result is equal to the value of the least significant bit of the integer p, n being the number corresponding to the first shift amount plus 1, and sends the second intermediate result to the first shift amount calculation unit, and
the addition/subtraction unit calculates the second intermediate result by adding the integer p to the value, which is obtained by adding the first intermediate result which has been bit-shifted by the first shift amount to the integer y which has been bit-shifted by the second shift amount, when the value of the n-th bit from the least significant bit in the first intermediate result is not equal to the value of the least significant bit of the integer p, and sends the second intermediate result to the first shift amount calculation unit.

11. The arithmetic device according to claim 8,
wherein the redundant binary representation is a Non-Adjacent Form (NAF).

12. The arithmetic device according to claim 8,
wherein when the first intermediate result when the sum is equal to the number of bits of the integer p is less than 0, the output unit outputs a value obtained by adding the integer p to the first intermediate result as the Montgomery multiplication result z, and
wherein when the first intermediate result when the sum is equal to the number of bits of the integer p is equal to or greater than p, the output unit outputs a value obtained by subtracting the integer p from the first intermediate result as the Montgomery multiplication result z.

13. The arithmetic device according to claim 1,
wherein the addition/subtraction unit calculates the second intermediate result by adding/subtracting, with respect to the first intermediate result which has been bit-shifted by the first shift amount, the integer p, and the product of the integer y which has been bit-shifted by the second shift amount and the value of a bit which is one place higher than a processed bit for which the number of continuous zeroes has been counted in the integer x of the redundant binary representation, and sends the second intermediate result to the first shift amount calculation unit.

14. The arithmetic device according to claim 13,
wherein the addition/subtraction unit calculates the second intermediate result by subtracting the integer p from a value, which is obtained by adding the first intermediate result which has been bit-shifted by the first shift amount to the integer y which has been bit-shifted by the second shift amount, when the value of an n-th bit from the least significant bit in the first intermediate result is equal to the value of the least significant bit of the integer p, n being the number corresponding to the first shift amount plus 1, and sends the second intermediate result to the first shift amount calculation unit, and
the addition/subtraction unit calculates the second intermediate result by adding the integer p to the value, which is obtained by adding the first intermediate result which has been bit-shifted by the first shift amount to the integer y which has been bit-shifted by the second shift amount, when the value of the n-th bit from the least significant bit in the first intermediate result is not equal to the value of the least significant bit of the integer p, and sends the second intermediate result to the first shift amount calculation unit.

15. The arithmetic device according to claim 13,
wherein the redundant binary representation is a Non-Adjacent Form (NAF).

16. The arithmetic device according to claim 13,
wherein when the first intermediate result when the sum is equal to the number of bits of the integer p is less than 0, the output unit outputs a value obtained by adding the integer p to the first intermediate result as the Montgomery multiplication result z, and
wherein when the first intermediate result when the sum is equal to the number of bits of the integer p is equal to or greater than p, the output unit outputs a value obtained by subtracting the integer p from the first intermediate result as the Montgomery multiplication result z.

17. The arithmetic device according to claim 1,
wherein the addition/subtraction unit calculates the second intermediate result by subtracting the integer p from a value, which is obtained by adding the first intermediate result which has been bit-shifted by the first shift amount to the integer y which has been bit-shifted by the second shift amount, when the value of an n-th bit from the least significant bit in the first intermediate result is equal to the value of the least significant bit of the integer p, n being the number corresponding to the first shift amount plus 1, and sends the second intermediate result to the first shift amount calculation unit, and
the addition/subtraction unit calculates the second intermediate result by adding the integer p to the value, which is obtained by adding the first intermediate result which has been bit-shifted by the first shift amount to the integer y which has been bit-shifted by the second shift amount, when the value of the n-th bit from the least significant bit in the first intermediate result is not equal to the value of the least significant bit of the integer p, and sends the second intermediate result to the first shift amount calculation unit.

18. The arithmetic device according to claim 1,
wherein the redundant binary representation is a Non-Adjacent Form (NAF).

19. The arithmetic device according to claim 1,
wherein when the first intermediate result when the sum is equal to the number of bits of the integer p is less than 0, the output unit outputs a value obtained by adding the integer p to the first intermediate result as the Montgomery multiplication result z, and
wherein when the first intermediate result when the sum is equal to the number of bits of the integer p is equal to or greater than p, the output unit outputs a value obtained by subtracting the integer p from the first intermediate result as the Montgomery multiplication result z.

* * * * *